United States Patent
Sung et al.

(10) Patent No.: US 7,516,282 B2
(45) Date of Patent: Apr. 7, 2009

(54) CONTROL DEVICE AND CONTROL METHOD FOR MEMORY

(75) Inventors: Ming-Hsun Sung, Hsinchu (TW); Yu-Lin Hsieh, Tainan (TW)

(73) Assignee: ITE Tech. Inc., Hsinchu (TW)

( * ) Notice: Subject to any disclaimer, the term of this patent is extended or adjusted under 35 U.S.C. 154(b) by 305 days.

(21) Appl. No.: 11/530,025

(22) Filed: Sep. 8, 2006

(65) Prior Publication Data
US 2007/0271423 A1 Nov. 22, 2007

(30) Foreign Application Priority Data
May 16, 2006 (TW) ............................... 95117254 A

(51) Int. Cl.
*G06F 12/00* (2006.01)
(52) U.S. Cl. ..................... 711/154; 711/5; 711/103; 711/151; 711/205
(58) Field of Classification Search ................ 711/154, 711/5, 103, 151, 205
See application file for complete search history.

(56) References Cited

U.S. PATENT DOCUMENTS

| | | | |
|---|---|---|---|
| 5,692,138 A * | 11/1997 | Fandrich et al. | 710/305 |
| 5,860,083 A * | 1/1999 | Sukegawa | 711/103 |
| 6,697,885 B1 * | 2/2004 | Goodfellow | 710/22 |
| 7,050,331 B2 * | 5/2006 | Matsuoka et al. | 365/185.05 |

OTHER PUBLICATIONS

Intel Corporation, "Programming Interface for Bus Master IDE Controller, Rev. 1.0", pp. 1-6, May 16, 1994.*

* cited by examiner

*Primary Examiner*—Stephen C Elmore
(74) *Attorney, Agent, or Firm*—Jianq Chyun IP Office

(57) ABSTRACT

A control device for a memory is provided. The control device includes a micro-control unit (MCU), a command queue, a command sequencer, and a table. The control device is coupled to the memory and is used for controlling the memory to execute an operation. In which, the MCU outputs a control signal according to the operation. The command sequencer sequentially stores command sets required by the execution of the operation according to the control signal, and each command set includes plural commands. The command queue sequentially stores command set contents according to the order of the corresponding command sets. The table stores a target address of the memory required by the execution of the operation.

8 Claims, 2 Drawing Sheets

CONTROL DEVICE AND CONTROL METHOD FOR MEMORY

CROSS-REFERENCE TO RELATED APPLICATION

This application claims the priority benefit of Taiwan application serial no. 95117254, filed May 16, 2006. All disclosure of the Taiwan application is incorporated herein by reference.

BACKGROUND OF THE INVENTION

1. Field of the Invention

The present invention is related to a control device for a memory, and more particularly, to a control device and control method with programmable memory protocol for elastically controlling memories from various suppliers.

2. Description of the Related Art

In various storage media, the use of pen drives is increasingly popular since they have features of small volume, big capacity, and convenience. Generally, the pen drive uses a nonvolatile memory, such as flash memory, as a storage unit. Manufacturers control the flash memories with appropriate memory protocols according to the flash memories from various suppliers.

The memory protocol means transmitting a command corresponding to the operations, such as data reading, writing, or erasing, defined by the memory suppliers to a given memory address. The memory protocols in general are implemented in software and hardware. For software, the micro controller unit (MCU) communicates with the flash memory via a memory interface, and each command is given by the MCU. In addition to increasing power consumption of the MCU, the entire working performance is reduced due to the MCU needs several cycles to execute each command.

For hardware, the MCU and some logic control circuitries communicate with the flash memory via the memory interface, and these logic control circuitries are, for example, state machine circuitries. However, because not all the commands or the ways of giving the commands to operate the flash memories from various suppliers are the same, for instance, a supplier may add operations and commands which other suppliers do not include to speed up reading and writing, the design of logic control circuitries have to be changed to meet the requirements of various suppliers. Therefore, logic gate counts need to be increased for the memory protocol, and the design lacks flexibility.

SUMMARY OF THE INVENTION

It is an object of the present invention to provide a control device and control method for a memory which has a programmable memory protocol to elastically control memories from various suppliers.

To achieve the previously mentioned and other objects, the present invention provides a control device for a memory. The control device coupled to the memory is used for controlling the memory to execute an operation, and the operation includes reading, writing, or erasing. The control device includes a micro-control unit (MCU), a command sequencer, a command queue, and a table. In which, the MCU outputs a control signal according to the operation. The command sequencer sequentially stores command sets required by the execution of the operation according to the control signal, and each command set includes a plurality of commands. The command queue sequentially stores command set contents according to the order of the corresponding command sets. The table stores a target address of the memory required by the execution of the operation and the number of execution iterations required to complete the operation. In an embodiment, the memory is a nonvolatile memory. In another embodiment, the memory is a flash memory.

To achieve the previously mentioned and other objects, the present invention provides a control method for a memory, and the control device is coupled to the memory. The control device includes a micro-control unit (MCU), a command sequencer, a command queue, and a table. First, the MCU, according to an operation of the memory, controls the command sequencer to sequentially store command sets required by the execution of the operation according to the control signal, and each command set includes a plurality of commands. Second, the command queue sequentially stores command set contents according to the order of the corresponding command sets, and the table stores a target address of the memory required by the execution of the operation and the number of execution iterations required to complete the operation; wherein, the operation includes reading, writing, erasing, or replicating. Next, the MCU controls the control device to cooperate with the command set contents to sequentially execute the command sets.

To achieve the previously mentioned and other objects, the present invention provides a memory device comprising the above mentioned control device and a memory. The above mentioned control device coupled to the memory is used for controlling the memory to execute an operation, and the operation includes reading, writing, erasing, or replicating.

The memory protocol of the present invention with the MCU, the command sequencer, the command queue, and the table can be programmable, and thus memories from various suppliers can be controlled by various protocols.

For a better understanding of the above mentioned objects, features, and advantages of the present invention, reference will now be made, by way of a preferred embodiment, to the accompanying drawings.

DETAILED DESCRIPTION OF PREFERRED EMBODIMENT

Figure 1:
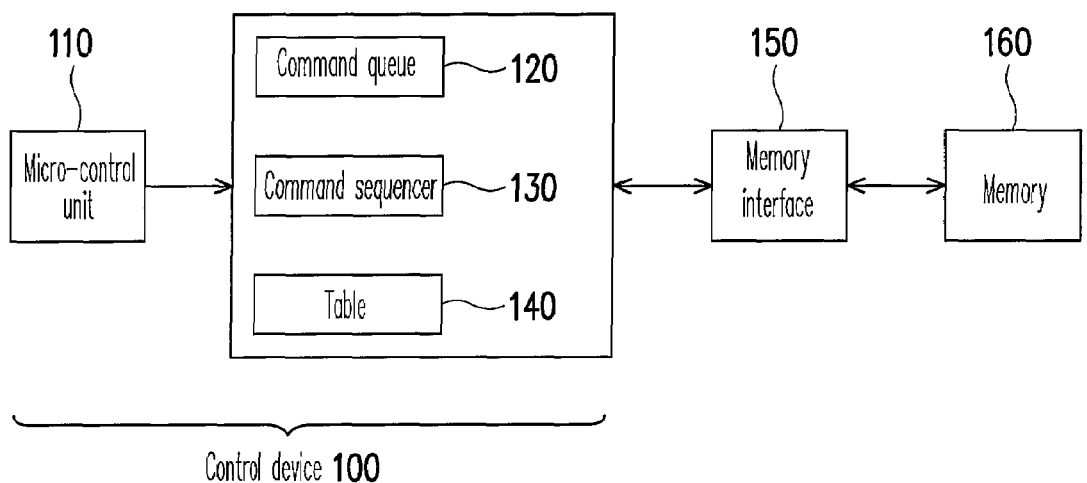
FIG. 1 is a block diagram of the memory device in accordance with an embodiment of the present invention.

FIG. 1 is a block diagram of the memory device in accordance with an embodiment of the present invention. Referring to FIG. 1, the memory device includes a control device 100, a memory interface 150, and a memory 160, and the control device 100 includes a micro control unit (MCU) 110, a command queue 120, a command sequencer 130, and a table 140. The control device 100 coupled to the memory 160 via the memory interface 150 is used for controlling the memory 160 to execute an operation including reading, writing, erasing, or replicating. In an embodiment, the memory 160 can be a nonvolatile memory, such as flash memory; and the table 140 can be physical region descriptor table (PRD table).

Figure 2:
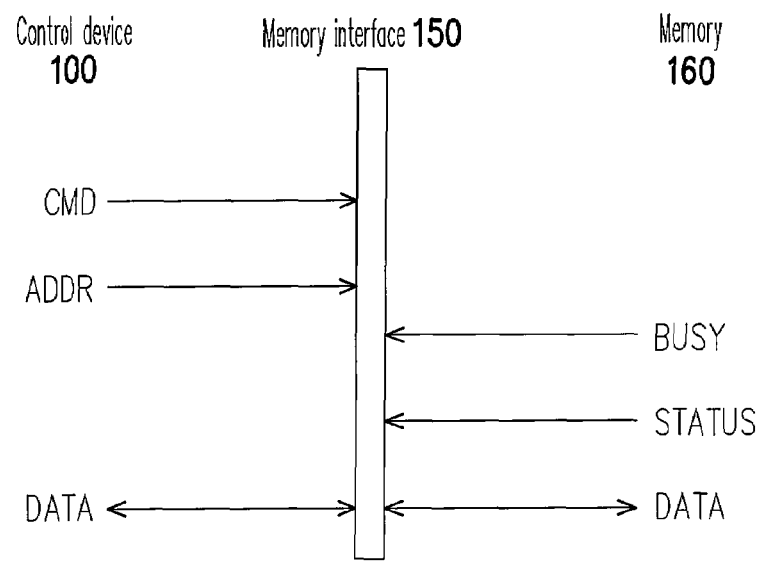
FIG. 2 is a classification of commands for operating the memory in accordance with an embodiment of the present invention.

For the above mentioned operations, the commands of the memories from various suppliers can be generalized as shown in FIG. 2. Referring to FIG. 2, the control device 100 gives command (CMD), address (ADDR), and data (DATA) commands to the memory 160 via the memory interface 150, and the memory 160 gives busy (BUSY), status (STATUS), and DATA commands to the control device 100. Except that the DATA command can be given to the memory 160 by the control device 100 or vice versa, other commands are only given in one-way. Each command can be further subdivided, for example, the ADDR can be divided into a block address command and a page address command.

Figure 3:
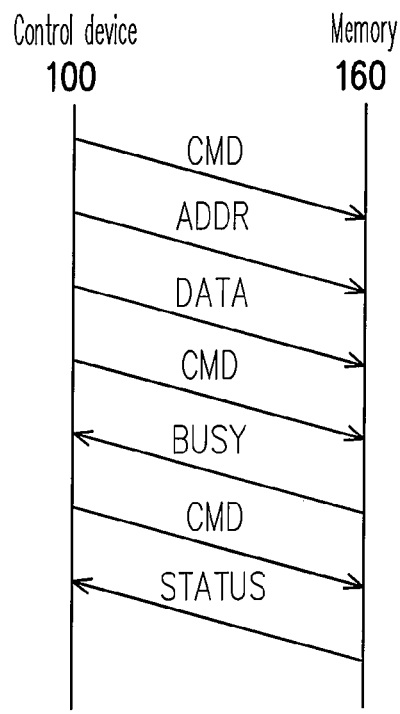
FIG. 3 is a diagram of commands for executing the memory writing operation in accordance with an embodiment of the present invention.

Executing a writing operation of the memory 160, for example, generally needs commands shown in FIG. 3. Referring to FIG. 3, the commands to execute the writing operation are sequentially CMD, ADDR, DATA, CMD, write (WT), CMD, and STATUS. The commands are given in accordance with the sequence indicated by arrows shown in FIG. 3. For example, the rightward direction means a command is given to the memory 160 by the control device 100, and the leftward direction means a command is given to the control device 100 by the memory 160. According to the interdependence between commands, the commands of the above mentioned operations can be divided into different sets. Each of the different sets of commands is defined as a command set constituted by a plurality of commands. For example, in FIG. 3, the writing operation needs three command sets, i.e. command sets of writing (including CMD, ADDR, and DATA commands), command sets of ensuring writing is complete (including CMD and WT commands), and command sets of ensuring writing is successful (including CMD and STATUS commands).

The following describes how to assemble and modify the memory protocols by the MCU 110, the command queue 120, the command sequencer 130, and the table 140 while facing the memories from various suppliers to elastically control the memory with respect to the writing operation of FIG. 3. Therefore, the control device of the present invention does not need extra hardware (or increase logic gate counts) for various memories. Besides, because the commands are stored in the hardware by the control device, not each command needs to be given by MCU so that the power consumption of the MCU is reduced and the working performance is improved.

Figure 4:
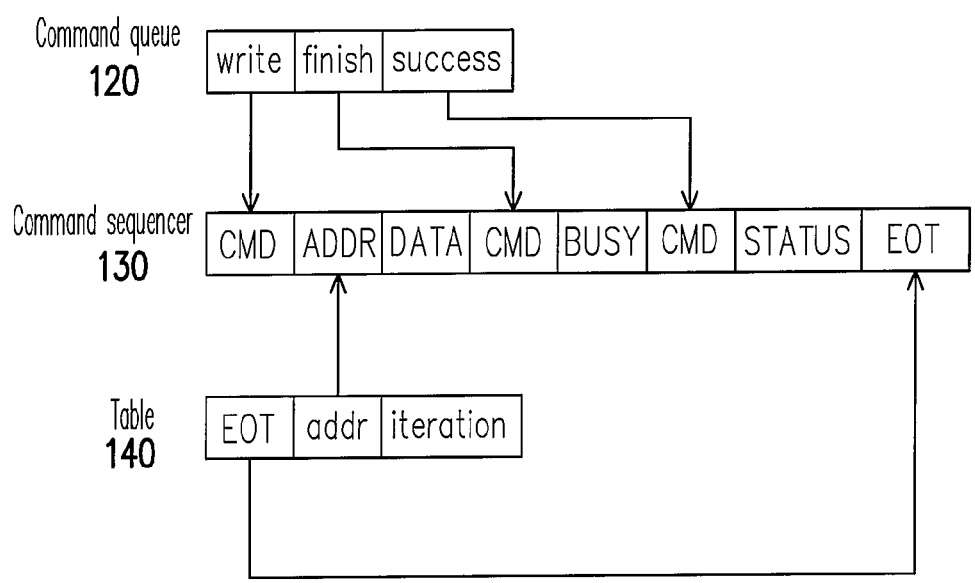
FIG. 4 is a diagram of the command queue, command sequencer, and table for executing the memory writing operation in accordance with an embodiment of the present invention.

Please refer to FIG. 4, which is a diagram of the command queue 120, the command sequencer 130, and the table (or PRD table) 140 of FIG. 1 while executing the writing operation of FIG. 3. For convenience, please refer to FIG. 1 and FIG. 4 at the same time.

The MCU outputs a control signal according to the operation of the memory, in this case, a writing operation. The command sequencer 130 sequentially stores command sets required by the execution of the writing operation according to the control signal of the MCU 110, and each of the command sets includes a plurality of commands respectively. There are three command sets required by the writing operation, i.e. command set of writing (including CMD, ADDR, and DATA commands), command set of ensuring writing is complete (including CMD and WT commands), and command set of ensuring writing is successful (including CMD and STATUS commands).

Therefore, the commands associated with the writing operation sequentially are CMD, ADDR, DATA, CMD, WT, CMD, and STATUS.

The command queue 120 sequentially stores command set contents according to the sequence of these corresponding command sets. For example, the command queue 120 sequentially stores command set contents write, finish, and success, respectively indicating the first CMD a command of writing, the second CMD a command of ensuring writing is complete, and the third CMD a command of ensuring writing is successful in CMD, ADDR, DATA, CMD, WT, CMD, and STATUS commands associated with the writing operation.

The table stores a target address "addr" required by the execution of the writing operation and the number "iteration" of execution iterations required to complete the writing operation, and the target address "addr" indicates an address where the data is written in the memory 160. Furthermore, if the maximum capacity of writing data into the memory is 32K bits every time, it needs to write five times when writing data with 160K bits. In this case, "iteration" is 5.

Again referring to FIG. 1 and FIG. 4, when the memory 160 executes the writing operation, the MCU 110 first sends a control signal so that the command sequencer 130 stores the commands of correct sequence associated with the writing commands, the command queue 120 stores command set contents associated with the command sets in the command sequencer 130, and the table 140 stores the target address "addr" where to write data into the memory 160 and the number "iteration" of required execution iterations. The commands stored by the command sequencer 130 are sequentially CMD, ADDR, DATA, CMD, WT, CMD, and STATUS, and the command set contents write, finish, and success stored by the command queue 120 respectively correspond to CMD commands in the above mentioned commands to indicate the contents of them.

Next, the control device 100 starts to execute command sets of writing (including CMD, ADDR, and DATA commands), command sets of ensuring writing is complete (including CMD and WT commands), and command sets of ensuring writing is successful (including CMD and STATUS commands) associated with the writing operation according to the command queue 120, the command sequencer 130, and the table 140.

In particular, the control device 100 first sends a CMD command with a content write, so the memory device starts to execute the writing operation. Next, an ADDR command is sent according to the target address "addr", and then a DATA command is sent. After finishing writing the data, the control device 100 sends a CMD command with a content finish. Later, the memory 160 sends a BUSY command until the memory 160 moves the data to a given place according to the target address "addr". Now, the control device 100 again sends a CMD command with a content success to make sure the writing operation succeed. After receiving the CMD command, the memory 160 sends a STATUS command to inform the writing operation's success or failure. Finally, reaching EOT (end of transmission), the control device 100 ends the writing operation. In fact, the command set contents (such as write, finish, etc.) stored in the command queue 120 and the commands (such as CMD, ADDR, etc.) stored in the queue sequencer 130 all can be represented by special codes. The command codes stored in the queue sequencer 130 are used to trigger the control device 100 to transmit some control signals of hardware (such as ALE) corresponding to the command codes to control the circuitry in the control device 100 which executes the command.

In summary, the present invention uses the control signal sent by the microprocessor such that the command sequencer stores commands of executing correct sequences, the command queue stores command set contents associated with the command sets in the command sequencer, and the table depicts the target address and the required number of execution iterations. Therefore, appropriate memory protocols can be generated to meet the memories from suppliers.

While the invention has been disclosed above with reference to preferred embodiments, it is not intended to be limited. Persons skilled in the art will recognize, however, that various modifications and changes may be made thereto without departing from the broader spirit and scope of the invention as set forth in the appended claims.

What is claims is:

1. A control device for a memory, coupled to the memory and configured for controlling the memory to execute an operation, the control device comprising:
    a micro-control unit (MCU) outputting a control signal according to the operation;
    a command sequencer sequentially storing a plurality of command sets required by the execution of the operation according to the control signal, wherein each command set includes a plurality of commands;
    a command queue sequentially storing contents of the command sets according to the sequence of storing the command sets; and
    a table storing a target address of the memory required by the execution of the operation.

2. The control device according to claim 1, wherein the table is used to store the number of execution iterations required to complete the operation.

3. The control device according to claim 1, wherein the memory comprises a nonvolatile memory.

4. The control device according to claim 1, wherein the operation is one of reading, writing, erasing, and replicating.

5. A memory device comprising a control device and a memory, wherein the control device is coupled to the memory and is used for controlling the memory, the control device comprising:
    a micro-control unit (MCU) outputting a control signal according to the operation;
    a command sequencer sequentially storing a plurality of command sets required by the execution of the operation according to the control signal, wherein each command set includes a plurality of commands;
    a command queue sequentially storing a plurality of command set contents according to the sequence of storing the command sets; and
    a table storing a target address of the memory required by the execution of the operation.

6. A control method for a memory, wherein the memory is coupled to a control device, and the control device comprises a micro-control unit (MCU), a command sequencer, a command queue, and a table, the control method comprising:
    according to an operation of the memory, the MCU controlling the command sequencer to sequentially store a plurality of command sets required by the execution of the operation, and each command set comprises a plurality of commands;
    the command queue storing contents of the command sets according to the sequence of storing the command sets, and the table storing a target address of the memory required by the execution of the operation; and
    the MCU controlling the control device to cooperate with the command set contents to sequentially execute the command sets.

7. The control method according to claim 6, further comprising the table storing the number of execution iterations required to complete the operation.

8. The control method according to claim 6, wherein the operation is one of reading, writing, erasing, and replicating.

* * * * *